(12) United States Patent
Matsuda et al.

(10) Patent No.: US 6,332,958 B1
(45) Date of Patent: *Dec. 25, 2001

(54) METHODS AND APPARATUS FOR REMOVING RESIDUAL MONOMERS

(75) Inventors: Etsuro Matsuda; Yuichi Ito; Toshinobu Kurazono, all of Kumamoto (JP)

(73) Assignee: Chisso Corporation, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/331,762
(22) PCT Filed: Dec. 24, 1997
(86) PCT No.: PCT/JP97/04789
§ 371 Date: Aug. 19, 1999
§ 102(e) Date: Aug. 19, 1999
(87) PCT Pub. No.: WO98/29460
PCT Pub. Date: Jul. 9, 1998

(30) Foreign Application Priority Data

Dec. 26, 1996 (JP) .................................... 8-348272

(51) Int. Cl.$^7$ .............. B01D 3/38; C08F 6/24; C08F 6/28
(52) U.S. Cl. .......................... 203/49; 159/16.3; 159/47.1; 159/DIG. 10; 202/155; 203/92; 203/96; 203/DIG. 9; 528/500; 528/501
(58) Field of Search .................. 203/49, 92, 96, 203/DIG. 9, 4, 39; 159/4.04, 4.4, 16.3, 47.1, DIG. 10; 528/500, 501; 202/155, 158

(56) References Cited

U.S. PATENT DOCUMENTS

| | | | |
|---|---|---|---|
| 4,077,135 | * | 3/1978 | Tzschoppe et al. .................. 34/57 R |
| 4,158,092 | * | 6/1979 | Bötsch et al. ........................ 528/500 |

(List continued on next page.)

FOREIGN PATENT DOCUMENTS

| | | |
|---|---|---|
| 0668134 | 8/1995 | (EP) . |
| 0756883 | 2/1997 | (EP) . |

(List continued on next page.)

Primary Examiner—Virginia Manoharan
(74) Attorney, Agent, or Firm—Wenderoth, Lind & Ponack, L.L.P.

(57) ABSTRACT

An apparatus and a method for removing residual monomers from a slurry containing a polyvinyl chloride. The apparatus has a cylindrical tower with plural perforated plates provided in a vertical direction in the tower, plural chambers formed on the perforated plates serving as their bottom surface, slurry introducing portions provided at two or more of the chambers, flow-down sections provided between the perforated plates to allow the slurry to sequentially flow down from the perforated plate of an upper chamber to the perforated plate of a lower chamber, a steam introducing port at a bottom portion of the tower, a deaerating port at a top portion of the tower, a slurry discharging port at a chamber below a chamber having the slurry introducing port, and hot water ejectors directly under the perforated plates directed at least toward the lower surface of the perforated plates. The apparatus is constructed so that the slurry introducing pipe is connected to a slurry introducing port through an on-off valve and the inside diameter of the slurry introducing pipe is progressively enlarged to 1.2 times or more toward the slurry introducing port.

5 Claims, 4 Drawing Sheets

U.S. PATENT DOCUMENTS

| | | | |
|---|---|---|---|
| 4,228,273 | * 10/1980 | Hughes | 528/501 |
| 4,282,348 | * 8/1981 | Wada et al. | 528/500 |
| 4,483,747 | 11/1984 | Aruga et al. | |
| 5,049,240 | * 9/1991 | Hamer et al. | 159/DIG. 16 |
| 5,804,039 | * 9/1998 | Kurazono et al. | 203/49 |

FOREIGN PATENT DOCUMENTS

| | | |
|---|---|---|
| 1577381 | 10/1980 | (GB) . |
| 6-107723 | 4/1994 | (JP) . |

* cited by examiner

METHODS AND APPARATUS FOR REMOVING RESIDUAL MONOMERS

The present invention relates to a method for removing residual monomers and an apparatus for removing residual monomers using the method. More specifically, the invention relates to a method and an apparatus for removing residual monomers by which unreacted residual monomers mainly comprising vinyl chloride monomers (hereinafter abbreviated to VCM) which remain in vinyl chloride resin (hereinafter abbreviated to PVC) particles and an aqueous medium when particularly a PVC is produced are removed.

BACKGROUND ART

While PVC is generally produced by suspension polymerization method, emulsion polymerization method, or bulk polymerization method, particularly a suspension polymerization method and emulsion polymerization method have widely been used from the advantages that the reaction heat can readily be removed and products in which the amount of impurities is small can be obtained.

Suspension polymerization method and emulsion polymerization method are usually conducted by charging VCM together with an aqueous medium, dispersing agent or emulsifier, and polymerization initiator into a polymerization vessel provided with a stirrer, and polymerizing the VCM while stirring and maintaining it at a predetermined temperature.

Usually, polymerization reaction is not continued to the point where VCM is converted by 100% to PVC, and it is terminated at a stage where production efficiency is high, that is, terminated at a polymerization conversion of 80 to 95%. After termination of the polymerization reaction, residual monomers in a polymerization vessel are separated from a PVC slurry (mixed dispersion comprising mainly PVC particles and an aqueous medium) and then recovered. However, the PVC slurry generally contains a few % of unreacted residual monomers.

Subsequently, the aqueous medium in the PVC slurry is mechanically separated, and the residue is dried by a hot-air drying or one of various other methods to form PVC powders. On this occasion, VCM is contained in the separated aqueous medium described above, exhaust air in a hot-air drying, and the PVC powders each in an extent which is made into a matter of concern on the grounds of environmental sanitation, or clearly considered to be harmful.

Various methods have been proposed to completely remove the discharges formed in such production and VCM in the PVC powders, or to decrease the content of VCM down to the extent at which it is harmless to environmental sanitation.

As the method for removing and recovering unreacted residual monomers more efficiently, methods for removing and recovering residual monomers from a PVC slurry by using a treating tower which has plural trays made of perforated plates therein and has a steam ejecting port at its bottom portion were proposed (Laid-open Japanese Patent Publication No. Sho 54-8693 and Laid-open Japanese Patent Publication No. Sho 56-22305).

Characteristics of these methods are trays made of perforated plates in which the base are constructed by perforated plates and partition walls are installed on the perforated plates so that treating passages are formed in a zigzag; a PVC slurry is exposed to steam ejected from a lower portion through perforations of the perforated plates, during the time when the PVC slurry flows along the treatment passages on the trays made of perforated plates, and residual monomers contained in the PVC slurry are evaporated and separated.

Further, a method and an apparatus for removing residual monomers were proposed in which bubbling caused in the upper section of a tower is suppressed by making its diameter larger than that of the lower section of the tower, thereby stabilized operation and prevention of incorporation of degraded particles formed by the bubbling become possible (Laid-open Japanese Patent Publication No. Hei 07-224109).

Contact time of the slurry with steam necessary for removing VCM in a PVC slurry differs according to the grade of PVC. Generally, a slurry of a PVC having a low polymerization degree is hardly demonomerized and a slurry of a PVC having a high polymerization degree is readily demonomerized.

However, in the methods described above, it is impossible to efficiently treat different grade of PVC slurries having different contact times with steam necessary for removing residual monomers in the same apparatus because residence time of PVC slurries is maintained constant by the treating passages and partition walls on the trays made of perforated plates.

That is, when a PVC slurry from which residual monomers are difficultly removed is treated in an apparatus which is designed for treating a PVC slurry from which residual monomers can readily be removed, contact time with steam is insufficient, and unreacted residual monomers can not sufficiently be removed from the PVC slurry. Conversely, when a PVC slurry from which residual monomers can readily be removed is treated in an apparatus which is designed for treating a PVC slurry from which residual monomers are difficultly removed, PVC particles contact with steam for a time longer than necessary after the residual monomers were removed, and thermal degradation of the PVC is caused, and quality of PVC products deteriorates.

In the plants for manufacturing PVC, usually many times a plural grades are produced by the same facility. Accordingly, if PVC powders remain in the equipment when a product grade is changed to a different one, PVC particles of different grades are incorporated to cause an inconvenience such as fish eyes, thereby to depreciate the value of products.

Even in the case where the same grade is treated, if PVC particles adhere within a tower for removing residual monomers and remain for long period of time, the particles cause thermal degradation by steam, and the particles unwillingly discolor brown (hereinafter, discoloration of particles by thermal degradation is referred to as coloration). If colored PVC particles adhered within the tower are fell off the wall surface of the tower and mixed in a PVC slurry, the value of products is reduced at the time of their processing.

In addition, in the method of demonomerization described above in which bubbling is suppressed, a PVC slurry disperses when it is introduced in a tower from a PVC slurry introducing portion, adheres on the internal wall of the tower, and causes such a problem of colored PVC particles as described above, whereas the residence degradation of a part of PVC can be prevented.

DISCLOSURE OF THE INVENTION

An object of the present invention is to provide an apparatus and a method for removing residual monomers from a slurry containing a polyvinyl chloride and residual monomers after polymerization by which apparatus and method adhesion of PVC particles on the internal wall of the tower can be averted by preventing the dispersion of slurry in a tower for removing residual monomers, formation of a PVC containing a high concentration of residual monomers due to insufficient treatment can be precluded by adjusting the treating time to a suitable one for each PVC slurry to be treated, degradation of the PVC by an excessive treatment with steam can be avoided, and quality deterioration due to mixing of different grade of slurries can be prevented, when residual monomers contained in the slurry are removed by a treatment with steam in the case where plural products having different properties are produced in the same equipment in turn.

As a result of diligent investigations by the present inventors, a method and an apparatus for removing residual monomers have been found by which residence time of a PVC slurry in an apparatus for removing residual monomers can be adjusted so as to be suitable for a plural grade of PVC slurries, dispersion of a PVC slurry at a slurry introducing portion can be prevented, PVC powders do not remain in a treating apparatus when a grade of slurry is changed to another grade, and PVC particles do not adhere on the internal wall of an apparatus, in an introducing pipe particularly at from a slurry introducing port to an on-off valve which tends to become a dead angle, and further in the on-off valve and a slurry introducing port.

Accordingly, the present invention is summarized as follows:

(1) A method for removing residual monomers from a slurry containing a polyvinyl chloride and residual monomers after polymerization by using an apparatus comprising a cylindrical tower which has plural perforated plates provided in a vertical direction in the tower, plural chambers formed respectively on the perforated plates serving as the bottom surface of the chambers, slurry introducing portions provided respectively at two or more of the chambers described above, flow-down sections such as downcomers provided between the perforated plates so as to allow the slurry to sequentially flow down from the perforated plate of an upper chamber to the perforated plate of a lower chamber, a steam introducing port provided at a bottom portion of the tower, a deaerating port provided at a top portion of the tower, a slurry discharging port provided at a chamber positioned lower than the chambers having the slurry introducing portion described above, and a hot water ejecting means provided directly under the perforated plates described above and directed toward at least the lower surface of the perforated plates described above characterized in that the amount of the slurry introduced is 0.1 to 300 m$^3$/h per 1 m$^2$ of the area of the perforated plate serving as the bottom surface of the chamber described above and the linear velocity of the slurry at the slurry introducing port of the chamber described above is 6 m/sec or lower when the slurry is introduced from the slurry introducing portion of the chamber described above.

(2) An apparatus for removing residual monomers from a slurry containing a polyvinyl chloride and residual monomers after polymerization characterized in that the apparatus comprises a cylindrical tower which has plural perforated plates provided in a vertical direction in the tower, plural chambers formed respectively on the perforated plates serving as the bottom surface of the chambers, slurry introducing portions provided at two or more of the chambers described above, flow-down sections such as downcomers provided between the perforated plates so as to allow the slurry to sequentially flow down from the perforated plate of an upper chamber to the perforated plate of a lower chamber, a steam introducing port provided at a bottom portion of the tower, a deaerating port provided at a top portion of the tower, a slurry discharging port provided at a chamber positioned lower than the chambers having the slurry introducing port described above, and a hot water ejecting means provided directly under the perforated plates described above and directed toward at least the lower surface of the perforated plates described above, the slurry introducing portions described above comprising slurry introducing ports provided at the tower described above and slurry introducing pipes connected to the slurry introducing ports, and the inside diameter of the slurry introducing pipes being enlarged to 1.2 times or more toward the slurry introducing ports.

(3) The apparatus for removing residual monomers recited in paragraph (2) above wherein an on-off valve is provided in the slurry introducing portion provided in a chamber positioned below the uppermost chamber.

(4) The apparatus for removing residual monomers recited in paragraph (3) above wherein the on-off valve in the slurry introducing portion is a ball valve.

(5) The apparatus for removing residual monomers recited in paragraph (3) above wherein a hot water ejecting means is provided between the slurry introducing port and the on-off valve in the slurry introducing portion with the hot water ejecting means being directed toward the on-off valve.

In the case where a PVC slurry which requires a long time for evaporating and separating residual monomers is treated according to the present invention, it is possible to secure a residence time and sufficiently remove residual monomers by introducing a PVC slurry from a slurry introducing portion at an upper chamber, since a PVC slurry introducing portion is provided at optional two or more chambers in an apparatus for removing residual monomers provided with trays made of perforated plates. On the other hand, when a PVC slurry from which residual monomers can be evaporated off in a short period of time is treated, heat degradation of PVC resin can be prevented and the monomers are satisfactorily removed by introducing a PVC slurry from a slurry introducing portion at a lower chamber since VCM can sufficiently be evaporated and separated in a short residence time.

In the present invention, a slurry is introduced so that its linear speed at a slurry introducing port is 6 m/sec or lower, and removal of residual monomers is carried out.

Therefore, the apparatus of the present invention preferably has such mechanisms as follows:

a) a slurry introducing portion is provided between a slurry introducing pipe and a slurry introducing port, b) the inside diameter of a slurry introducing portion at the side of the slurry introducing port is larger than that of the slurry introducing portion at the side of the slurry introducing pipe, c) the inside diameter of the slurry introducing portion is increased as it gets closer to the slurry introducing port, and d) the increase of the inside diameter is decided so that the linear speed of a slurry is maintained at 6 m/sec or lower (preferably 5 m/sec or lower) even if the volume of the slurry was increased by the difference in temperature and pressure at between the slurry introducing portion and slurry introducing port. Such ratio of pipe diameter is 1.2 or more, preferably 1.5 to 3.5, and more desirably 1.5 to 2.0.

Whereas the slurry (at a temperature of 50 to 150° C.) introduced from a slurry introducing portion is in a pressurized condition (0.5 to 10 kg/cm$^2$), the VCM contained in the slurry is vaporized and its volume is suddenly expanded at the time of slurry introduction since the temperature inside the tower is higher than that of the slurry in the slurry introducing pipe (usual temperature difference is 5 to 50° C.). At this time, if the diameters of the slurry introducing pipe and slurry introducing port of the tower were the same, the slurry comes to disperse on the internal wall of the tower by the expansion of volume and flow velocity by transportation with a pump. In order to avoid this, the volume corresponding to the expansion of slurry volume is secured by the space formed by the increase in the diameter of the pipe coming to the slurry introducing port, and the linear speed of slurry at the slurry introducing port is adjusted to 6 m/sec or lower and preferably 5 to 1 m/sec. By this, the dispersion of a slurry specifically due to the instantaneous volume expansion of a dissolved gas can be avoided, and the coloration of PVC particles adhered on the internal wall of a tower due to their exposure to steam for long time can be prevented. Slurry introducing port to be provided at a tower is desirably located at a position higher than the slurry surface in the chamber at which the slurry introducing port is provided. It is desirable that the diameter of a slurry introducing pipe is gradually increased so that flow of a slurry is not disturbed. Forward portion of a slurry introducing pipe than the portion where its diameter is increased is required to secure a slurry flow speed sufficient to flow the slurry by making its diameter smaller than that of a slurry introducing port so that PVC particles in a slurry do not deposit at a horizontal portion of the pipe and the blockage of the pipe does not occur.

On-off valve is desirably provided in a slurry introducing portion which is provided at a chamber located at a lower position than the uppermost chamber. The on-off valve provided in the slurry introducing pipe is used when one of a plurality of slurry introducing portions in a demonomerizing tower is selected and a slurry is introduced therethrough, in other words, when a slurry introducing portion to be used is selected depending on the demonomerization characteristic of a slurry. That is, a slurry can be supplied from a selected slurry introducing portion to a demonomerizing tower by opening the on-off valve in the selected slurry introducing portion and closing the on-off valve in other slurry introducing portions. As such on-off valve, a ball valve is preferable. It can be avoided by providing an on-off valve in each of a plurality of slurry introducing portions as described above that a residual resin contained in a slurry previously treated mixes from an introducing pipe which is not currently being used and that a slurry which is presently being treated incorporates in an introducing pipe which is not presently being used and becomes contamination at the time when this pipe is used next time.

It is preferable to provide a hot water ejecting apparatus between a slurry introducing port and an on-off valve in a slurry introducing portion with the apparatus being directed toward at least the on-off valve, and to wash the on-off valve, and the pipe portion between the on-off valve and slurry introducing port, when necessary. The slurry introducing port is preferably positioned as close as possible to the on-off valve so that the portion between them is easy to wash. This washing apparatus employing hot water is used, for example, during the time when a slurry is being introduced from a PVC slurry introducing portion and a demonomerizing treatment is being conducted, to wash other PVC slurry introducing portions which are not being used for introducing a PVC slurry. By such method, occurrence of colored particles due to a long stay of PVC particles at a PVC slurry introducing portion can efficiently avoided, and staying of PVC particles in the PVC slurry introducing portion at the time of changing grade can be prevented to avoid mixing of a different grade.

In the present invention, PVC means homopolymers of VCM, copolymers of VCM with a polymerizable monomer which can polymerize with VCM, polymers prepared by grafting VCM to olefin polymers or the like, and polymer compositions comprising two or more those polymers. In order to efficiently remove residual monomers according to the present invention, polymers containing 50% by weight or more of VCM as polymer constituting unit are preferable.

Method for obtaining the polymers may be suspension polymerization or emulsion polymerization.

As polymerizable monomer which can polymerize with VCM, carboxylic acid esters of vinyl alcohol such as vinyl acetate, vinyl ethers such as an alkylvinyl ether, unsaturated carboxylic acid esters such as acrylates and methacrylates, vinylidene halides such as vinylidene chloride and vinylidene fluoride, unsaturated nitriles such as acrylonitrile, and olefins such as ethylene and propylene can specifically be mentioned.

Since, in polymerization reactions, a dispersing agent such as polyvinyl alcohol and hydroxypropylmethyl cellulose and an emulsifier such as sodium alkylsulfate and sodium alkylsulfonate are used; and a buffer, particle diameter regulating agent, depressor for scale build up, defoaming agent, and the like are further used when necessary, a minor amount of these additives are sometimes mixed in a PVC slurry.

PVC slurries treated according to the present invention preferably have a concentration of PVC dispersed in the PVC slurries, that is, slurry concentration of 5 to 45% by weight, and the concentration is more desirably 10 to 40% by weight. When the slurry concentration is too high, flowablity of the PVC slurry in the tower becomes worse. On the other hand, when it is too low, efficiency of removing treatment lowers.

Whereas a PVC slurry to be treated according to the present invention is transferred into a PVC slurry tank after polymerization reaction was terminated, unreacted VCM was released by the internal pressure of the polymerization vessel and recovered, and then the internal pressure was reduced down to normal atmospheric pressure, the PVC slurry may be transferred into a PVC slurry tank before the pressure in the polymerization vessel is reduced to a normal atmospheric pressure, or a PVC slurry in the middle of polymerization may be transferred into the tank at the time when the polymerization was terminated at an optional polymerization conversion.

The PVC slurry transferred into a PVC slurry tank is introduced into an apparatus of the present invention for removing residual monomers at a predetermined flow rate by using a pump.

BEST MODE FOR CARRYING OUT THE INVENTION

An apparatus which can preferably be used in the present invention for removing residual monomers and a process for removing residual monomers from a PVC slurry by employing the apparatus are specifically described with reference to FIGS. 1 to 4. However, the present invention is by no means restricted to such specific description.

Figure 1:
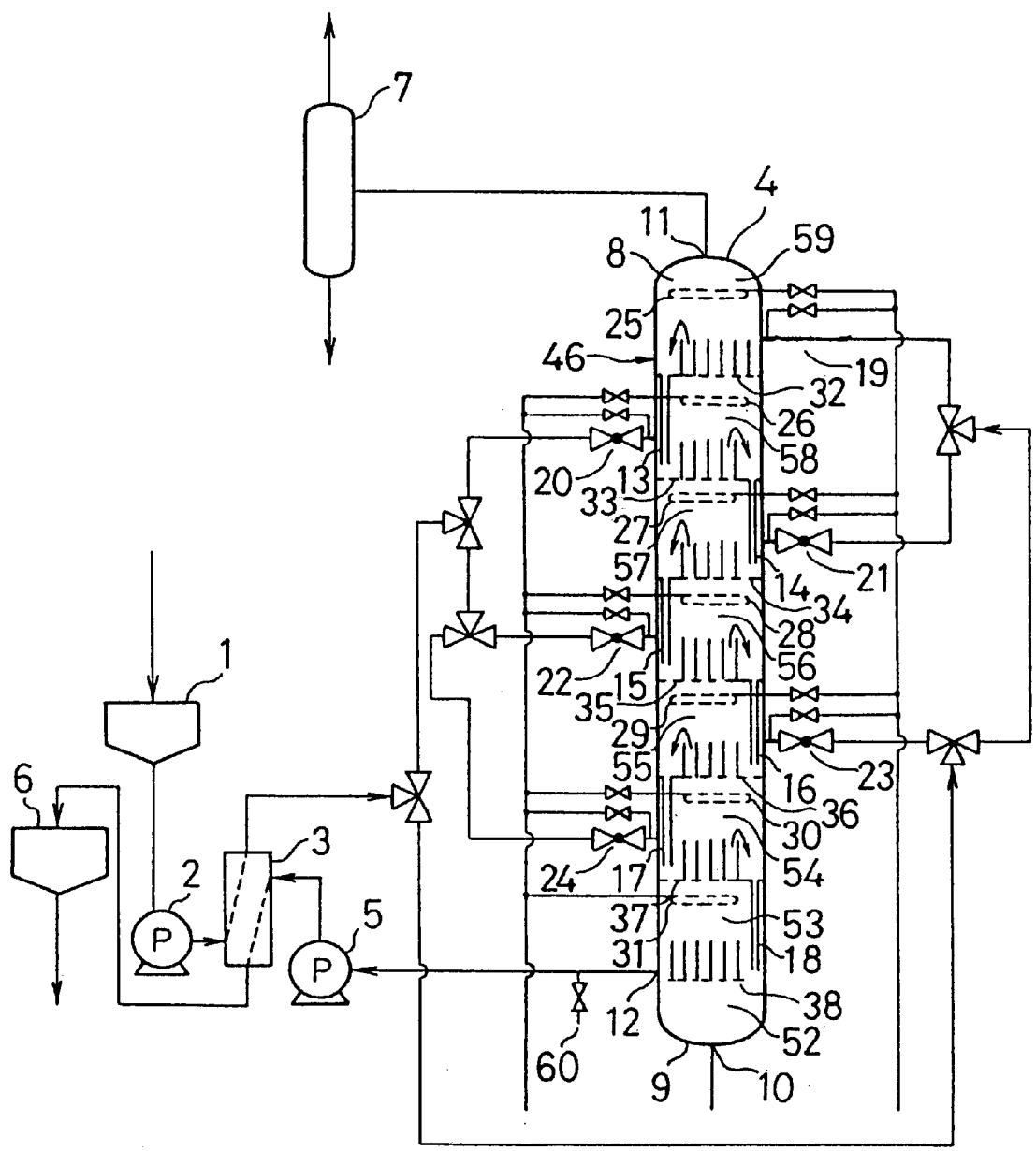
FIG. 1 is a schematic drawing showing an apparatus of the present invention for removing residual monomers.
Figure 2:
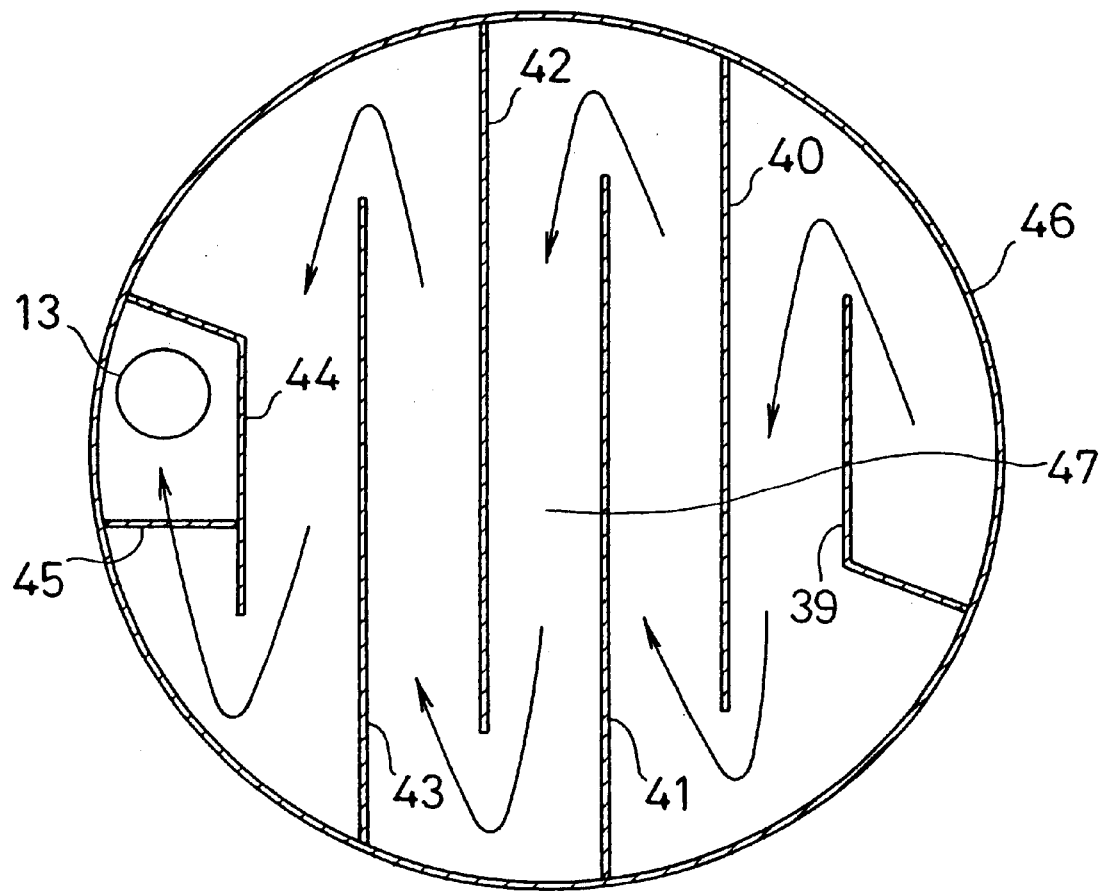
FIG. 2 is a schematic plan view of a perforated plate.
Figure 3:
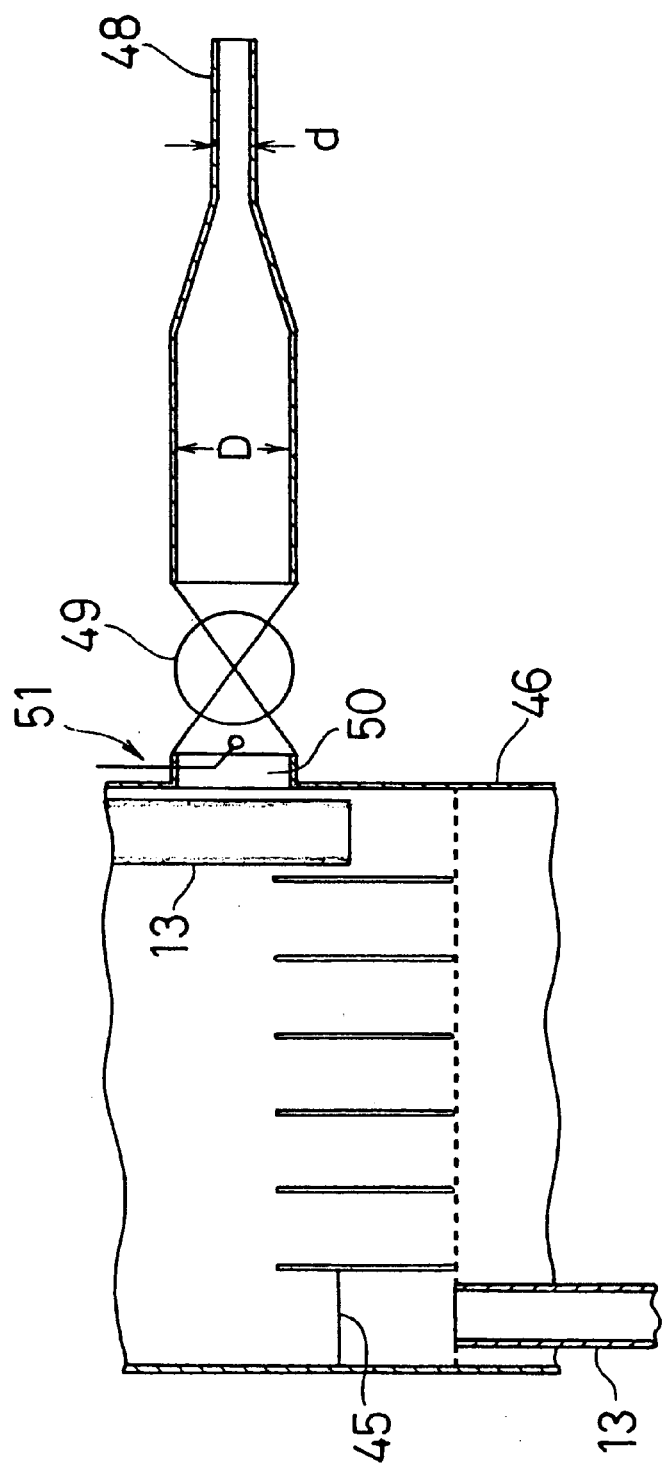
FIG. 3 is a schematic vertical cross-sectional view of a portion for introducing a PVC slurry onto a perforated plate.
Figure 4:
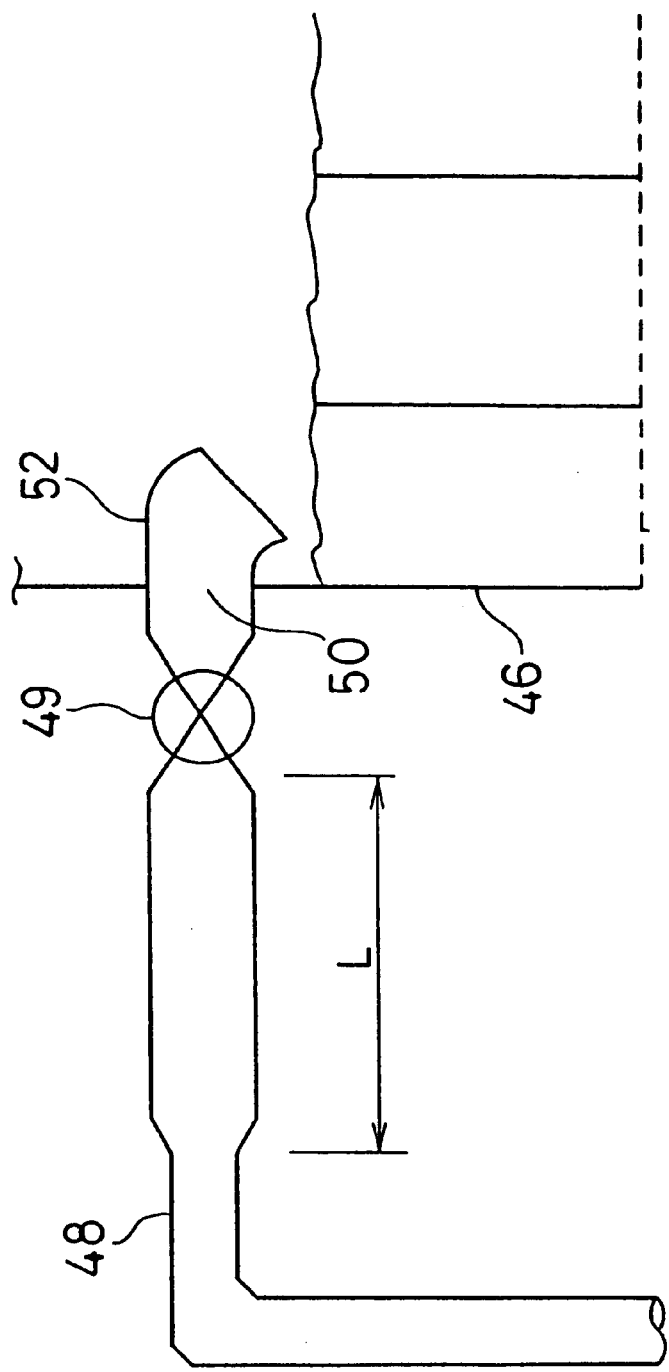
FIG. 4 is a schematic vertical cross-sectional view of a PVC slurry introducing portion.

FIG. 1 is a schematic drawing showing an apparatus for removing residual monomers, FIG. 2 is a schematic plan view of a plate, and FIGS. 3 and 4 are schematic vertical cross-sectional views of a PVC slurry introducing portion for introducing the slurry onto a perforated plate.

In FIG. 1, an apparatus 4 for removing residual monomers is constructed so that it comprises a cylindrical tower 46, plural perforated plates 32 to 38 provided in a vertical direction in the tower, a plurality of chambers formed respectively on the perforated plates serving as bottom surface of the chambers, slurry introducing devices 19 to 24 provided at two or more of the chambers described above, flow-down sections such as downcomers 13 to 18 provided between the perforated plates so as to allow the slurry to sequentially flow down from the perforated plate of an upper chamber to the perforated plate of a lower chamber, a steam introducing port 10 provided at a bottom portion of the tower, a deaerating port 11 provided at a top portion of the tower, a slurry discharging port 12 provided at a chamber positioned lower than the chambers having the slurry introducing devices described above, a hot water ejecting means 25 provided at the ceiling portion 8 in the tower and directed to the ceiling of the tower, and hot water ejecting means 26 to 31 provided directly under the perforated plates described above and directed toward at least the lower surface of the perforated plates described above. In the apparatus, a slurry introducing pipe 48 is connected to a slurry introducing port 50 through an on-off valve 49 as shown in FIGS. 3 and 4. And the inside diameter of the slurry introducing pipe 48 is enlarged so that it becomes 1.2 times or more (in the Figure, $D/d \geq 1.2$) in the direction towards the slurry introducing port 50.

PVC slurry obtained by a suspension polymerization or emulsion polymerization and temporarily stored in a PVC slurry tank 1 is led to a heat exchanger 3 with a pump 2, heated to a predetermined temperature in the heat exchanger 3, and then introduced into a tower from optional PVC slurry introducing portions 19 to 24 of an apparatus 4 for removing residual monomers. Whereas an on-off valve is not provided in slurry introducing portion 19 at the uppermost chamber, it may be provided when necessary.

Transport amount of a pump is preferably adjusted so that the flow rate of a PVC slurry introduced in a tower is 0.1 to 300 m³/h (more preferably 1 to 100 m³/h) per 1 m² of the area of perforated plate 47 shown in FIG. 2.

PVC slurry introduced in a tower is desirably in a condition preheated at 50 to 100° C. with heat exchanger 3. Efficiency of removing residual monomers is improved by this preheating.

Inside diameter of tower 46 is 200 to 10,000 mm, and the height of the tower is 2 to 20 times, preferably 5 to 15 times relative to the inside diameter. Also, inside diameter of each chamber in the tower may be different when necessary.

The space delimited with the bottom of a tower and a perforated plate, with a perforated plate and another perforated plate located at immediately upper position, or with a perforated plate and the top of a tower in apparatus 4 for removing residual monomers is referred to as chamber. Number of chambers necessary for treating residual monomers is decided by residence time required when residual monomers are removed from a PVC slurry.

Difficulty of removing monomers from a PVC slurry is caused by the structure of PVC particles in a PVC slurry. When the ratio of the volume of micropores in PVC particles is large, contact of PVC particles with steam is favorable and the particles are readily demonomerized, but when the ratio of the volume of micropores is small, demonomerization becomes difficult.

Residence time of a PVC slurry in a tower is decided by such difficulty of demonomerization from a PVC slurry as described above, concentration of residual monomers contained in a PVC slurry introduced into a tower, and a settings value of the concentration of residual monomers after the treatment at PVC slurry discharging port 12.

When the residence time of a PVC slurry in a tower is long, residual monomers can be removed at a high level from PVC particles existing in a PVC slurry. However, if the residence time is too long, coloring of PVC particles due to thermal degradation is unwillingly caused. Accordingly, contact of a PVC slurry with steam for a longer time than necessary is not preferable. Thus, the residence time is necessary to be adjusted with reference to the difficulty of demonomerization from a PVC slurry.

It is desirable to construct an apparatus used in the present invention so that a slurry introducing portion is provided at plural chambers disposed in a vertical direction in a tower, and for instance, a PVC slurry from which residual monomers are very difficultly removed is introduced from a PVC slurry introducing portion at an upper portion of a tower and a PVC slurry from which residual monomers are readily removed is introduced from a slurry introducing portion at a lower portion of a tower. Taking a PVC slurry from which residual monomers are very difficultly removed, as an example, the slurry is introduced into a tower from slurry introducing portion 19 at an upper portion of the tower. The slurry introduced is passes through treating passages formed by partition walls 39 to 44 on perforated plate 32 and tower 46, overflows partition board 45 (FIG. 3), and flows onto perforated plate 33 through downcomer 13. Subsequently, the slurry introduced on perforated plate 33 passes through treating passages on perforated plate 33 and further flows onto perforated plate 34 located under perforated plate 33 through downcomer 14. After passing through treating passages on perforated plates 32 to 38 in such a way as described above, the slurry is discharged outside a tower from PVC slurry discharging port 12 provided at the bottom chamber 52 of the tower. Also, in the case of a PVC slurry from which residual monomers are a little difficultly removed, for instance, the slurry is introduced from PVC slurry introducing portion 21, and passed through treating passages on perforated plates 34 to 38 to shorten residence time. In a like manner, in the case of a PVC slurry of a good demonomerization ability, for instance, a slurry is introduced from slurry introducing portion 23 to further shorten the residence time, and thus thermal degradation due to contact with steam more than necessary can be avoided.

Slurry introducing portion from which a PVC slurry is introduced comprises PVC slurry introducing pipe 48, on-off valve 49, and PVC slurry introducing port 50 as shown in FIG. 3, and the inside diameter of PVC slurry introducing pipe 48 is enlarged to 1.2 times or more, preferably to 1.5 to 3.5 time, and more desirably to 1.5 to 2.0 times in the direction toward slurry introducing port 50.

In another embodiment, slurry introducing pipe 48 preferably has a shape in which horizontal portion L having an enlarged diameter is 1 m long or more as shown in FIG. 4, and guide pipe 52 opened to the liquid surface in a tower is provided inside the slurry introducing port. Turbulence of flow due to sudden volume expansion of a slurry can be eased by providing a horizontal portion having an enlarged diameter longer than a predetermined length as described above, and vaporization of VCM in an introducing pipe can be repressed by the weight of a slurry itself. Also, it is possible to selectively introduce a slurry onto the liquid surface on a perforated plate to prevent its dispersion, and to let the vaporized VCM readily escape in a gas phase portion in a tower by providing guide pipe 52. In this connection, the slurry introducing pipe may be provided at an angle toward a slurry introducing port so that a slurry is hardly retained.

Further, in the slurry introducing portion, hot water ejecting means 51 is provided between slurry introducing port 50 and on-off valve 49. Hot water ejecting means 51 comprises a hot water pipe provided through the side portion of a slurry introducing port, and a spray nozzle provided at the tip thereof. The spray nozzle is preferably arranged with the nozzle being directed toward an on-off valve so that the PVC in the dead space between an on-off valve and a slurry introducing port can be washed away.

On-off valve 49 in a PVC slurry introducing portion preferably has a structure in which a PVC slurry is not retained in a valve and PVC slurry introducing portion. While there are no specific restrictions so far as the valve has such structure, its structure is preferably ball valve in particular. If it is a ball valve, a PVC slurry does not remain in the valve, PVC particles do not stay in a PVC slurry introducing portion even when the grade of a PVC slurry to be treated is changed, and thus such excellent results that fish eyes due to mixing of different grades do not occur in final PVC molded articles can be obtained. With regard to the position of the valve, when it is provided at a position as close to a tower as possible, a slurry does not remain between a PVC slurry introducing port and the valve, and thus better results are obtained.

Further, such hot water washing apparatus 51 as described above can be provided in a PVC slurry introducing portion to id avoid mixing of different grades when a PVC slurry to be treated is changed. Occurrence of fish eyes due to mixing of different grades is decreased by washing a PVC slurry introducing port with the hot water washing apparatus at the time of changing grade or during operation for removing residual monomers.

Also, remaining of a PVC slurry for long time in a slurry introducing portion can be avoided by washing a slurry introducing portion which is not being used for introducing a PVC slurry, at the time of operation of an apparatus for removing residual monomers.

Perforated plates 32 to 38 having many small holes are provided with several partition walls vertically set up on each surface of the plates, and form a chambers (spaces) between the lower surface of upper perforated plates and them. The small holes of the perforated plates are bored so that a demonomerization treatment is conducted with steam ejected from the perforations when a slurry flows on the perforated plates.

Size of the small holes is decided in consideration of steam pressure and the amount of steam to be introduced so that a PVC slurry does not flow down through small holes, the small holes are not blockaded, and the steam ejected from a lower position uniformly passes through the small holes.

Diameter of the small holes to be bored in the perforated plates is 5 mm or less, preferably 0.5 to 2 mm, and more desirably 0.7 to 1.5 mm. Opening ratio (total area of perforations/area of perforated plate) in a perforated plate is 0.001 to 10%, preferably 0.04 to 4%, and more desirably 0.2 to 2%.

When the perforation ratio is excessively small, PVC particles suspended in a PVC slurry which flows on trays made of perforated plates are not sufficiently stirred, PVC particles settle out, and the efficiency of removing residual monomers from PVC particles is decreased. Flowability of a PVC slurry is also decreased. On the other hand, when the opening ratio is too large, a phenomenon in which a PVC slurry flows down through the small holes (hereinafter referred to as liquid leakage) occurs, and a large amount of steam is unwillingly wasted to prevent the liquid leakage from the small holes.

Partition walls are to secure on perforated plates treating passages through which a PVC slurry can flow. By providing treating passages formed by partition walls, a PVC slurry flows on perforated plates for a certain period of time during which the slurry is subjected to demonomerization with the steam supplied from a lower portion. In FIGS. 2 and 3, perforated plate 47 is shown on the upper surface of which partition walls 39 to 44 are provided alternately.

Residence time of a PVC slurry within an apparatus for removing residual monomers corresponds to the time in which a PVC slurry passes through treating passages on perforated plates. Accordingly, it is sufficient for long treating time to increase the number of partition walls to extend a treating passage or to raise the partitions walls. While treating passages are decided by the manner of arranging partition walls, a meandering form (winding or zigzag form) shown in FIG. 2 is preferable, and a spiral form, arrow wheel form, or star form (radial) can be selected depending on the circumstances in addition.

While the number of partition walls and width of treating passages on perforated plates are not specifically restricted, it is not desirable that the number of the partition wall is excessively increased or the width of the treating passages is made too small, because the liquid surface of a flowing PVC slurry rises to overflow the partition walls, PVC slurries which are different in residence time are mixed, and thus qualities of products are deteriorated.

The apparatus of the present invention has steam introducing port 10 at the bottom chamber 9 a tower, and for instance, a PVC slurry from steam introducing port 10 is blown, through the small holes of perforated plates, in the PVC slurry which is flowing on perforated plates. The amount of steam introduced at this time is 1–100 kg/h and preferably 5 to 50 kg/h per 1 $m^3$ of a PVC slurry. When the amount of steam to be introduced is too small, it becomes impossible to efficiently remove residual monomers in a PVC slurry since PVC particles in the PVC slurry settle out. On the other hand, when the amount of steam to be introduced is too large, dispersion of a PVC slurry becomes vigorous and sometimes flooding occurs. Besides, the effect of removing residual monomers in a PVC slurry is not increased for the large amount of steam introduced.

When the temperature of a PVC slurry is high, the efficiency of removing residual monomers is increased. However, when the temperature is too high, it causes coloring of PVC particles due to thermal degradation, and deteriorates the qualities. Accordingly, adjustment of the temperature of a PVC slurry links to production of a PVC having high qualities. Generally it is desirable to adjust the temperature of steam and the amount of steam to be introduced so that the temperature of the slurry which flows on perforated plates is 50 to 150° C., preferably 70 to 120° C., and more desirably 80 to 110° C.

Pressure inside a tower 4 of an apparatus for removing residual monomers is desirably maintained at 0.2 to 3 $kg/cm^2$ (abs).

In the tower 4 of an apparatus of the present invention for removing residual monomers, at least one hot water ejecting apparatus is provided. In the apparatus shown in FIG. 1, hot water ejecting means 25 to 31 are constructed by forming a pipe into a predetermined shape, the hot water ejecting means are provided directly under perforated plates 31 to 36, and the lower surface of perforated plates and inside wall of a tower are washed by ejecting hot water at predetermined intervals from ejecting nozzles. While the number of ejecting nozzles and the position of the nozzle orifices are not specifically restricted, it is preferable to arrange the orifices so that the hot water is ejected from the ejecting nozzles in the range of 10 to 60° of crossing angle relative to the vertical line.

Plane shape of the pipe of hot water ejecting apparatuses 25 to 31 is usually Ω or φ form of Greek letter, spiral form, star form, or a meandering form (winding or zigzag form). It may be a type of multiple rings having the same center. It is sufficient that the hot water ejecting apparatuses 25 to 31 are provided in parallel with perforated plates and can be put in a tower. However, the hot water ejecting apparatuses 25 to 31 are favorably provided so that their outer diameter come to the distance 20 mm or more apart inwardly from the inside wall of a tower, since if they were placed too close to the inside wall of a tower, the clearances come to be in danger of being blockaded with washed away PVC particles and the likes. Outer diameter of the hot water ejecting apparatuses 25 to 31 is preferably 150 to 8,000 mm.

As to the shape of ejecting nozzle orifices provided in hot water ejecting apparatuses 25 to 31, a suitable shape such as a circle, ellipse, and slit can be selected depending on the purpose of use. In this connection, the diameter of the circular orifices or the diameter at the maximum equator of the elliptic orifices can usually be selected from 1 to 8 mm, and the maximum length of the slit can also be selected from 1 to 8 mm.

The PVC slurry from which residual monomers were removed by apparatus 4 for removing residual monomers is led to heat exchanger 3 with pump 5, cooled by heat exchange, temporarily stored in PVC slurry tank 6, and then fed to a drying apparatus (not shown in Figs.) through dehydration step. Monomer gas removed in an apparatus for removing residual monomers passes through deaerating port 11 at a top portion of a tower, steam is condensed and separated from the gas in condenser 7, and then the gas is transferred to a liquefaction and recovery step. In this step, when a large amount of vinyl chloride monomers are contained in condensed water condensed in condenser 7, the condensed water may be introduced into an apparatus for removing residual monomers and treated again.

The present invention will next be described in more specifically by way of Examples and Comparative Examples. However, the scope of the present invention is by no means limited by such specific examples.

In the following Examples and Comparative Examples, evaluations were made as follows:

(1) Method for Determining Concentration of Residual Monomers

A PVC slurry which was subjected to a treatment for removing residual monomers and discharged from PVC slurry discharging port 12 was sampled and dehydrated. Subsequently, the concentration of residual vinyl chloride monomers in vinyl chloride polymers in the range of ppb was determined by Head Space method using a gas chromatograph 9A (trade name) produced by Shimadzu Corp. Determination conditions were in accordance with those of ASTM D4443, and FID was used for the detecting section.

(2) Method for Determining Thermal Degradation

A PVC slurry before and after removal of residual monomers were dehydrated, respectively, dried at 40° C. for 24 hours, molded into PVC plates with the following composition and under the following roll conditions, and then degree of thermal degradation was determined according to the method of JIS K7105. It indicates that the larger the measurement value, the larger the thermal degradation.

| Composition: | |
| --- | --- |
| PVC | 100 parts |
| Tri-basic lead sulfate | 3 parts |
| Di-basic lead sulfate | 1 part |
| Calcium stearate | 1 part |
| Stearic acid | 0.5 part |
| Roll conditions: | |
| Roll type | 8 inch roll |
| Roll temperature | 170° C. |
| Rolling time | 15 minutes |
| Thickness of rolled sheet | 0.32 mm |

(3) Method for Evaluating Fish Eyes

A PVC film prepared by processing, under the following conditions, a PVC resin obtained by drying a PVC slurry which was subjected to a treatment for removing residual monomers and sampled from sampling port 60 in FIG. 1, was divided into five sections of 100 cm² each, number of fish eyes in each of the sections was counted, and the average of the numbers was taken.

| Composition: | |
| --- | --- |
| PVC | 100 parts |
| Dioctyl phthalate | 45 parts |
| Lead type stabilizer | 4 parts |
| Roll conditions: | |
| Roll type | 6 inch roll |
| Roll temperature | 150° C. |
| Rolling time | 5 minutes |
| Thickness of rolled sheet | 0.32 mm |

(4) Method for Evaluating Adhesion of PVC Particles on the Wall of a Tower for Removing Residual Monomers After the operation for the same grade with a tower for removing residual monomers for 48 hours in total, the wall surface of the chambers in which a PVC slurry was introduced was observed to confirm the extent of adhesion of PVC particles. Evaluation was made according to the following criteria A . . . Inside wall of a tower maintained a metallic luster and PVC particles were not adhered on the wall surface.

B . . . PVC particles were adhered on the wall surface, but they were readily removed by washing with water.

C . . . PVC particles were adhered on the wall some of which particles were not removed by washing with water and discolored brown.

D . . . PVC particles were adhered in a layer form and discolored dark brown.

EXAMPLE 1

The apparatus for removing residual monomers used in Example 1 had a structure similar to that shown in FIGS. 1 to 3, and had the following specifications:

| | |
|---|---|
| a) Tower for removing residual monomers | |
| Number of chambers | 8 |
| PVC slurry introducing portions were provided at fourth, fifth, sixth, seventh, and eighth chambers from the bottom. | |
| b) Perforated plates | |
| Diameter of plates: | 1500 mm |
| Diameter of small holes: | 1.3 mm |
| opening ratio: | 0.3% (total area of small holes/area of perforated plate) |
| Partition walls (height): | 500 mm |
| Width of treating passages: | 200 mm |
| c) Hot water ejecting apparatus | |
| Diameter: | 900 mm |
| Shape: | Ring shape having a pipe diameter of 50A (outside diameter 60.5 mm) |
| d) PVC slurry introducing portion | |
| Diameter of PVC slurry introducing pipe: | 80A to 150A (D/d = 150/80) |
| Diameter of PVC slurry introducing port: | 150A |
| Type of valve: | Ball valve |

A PVC slurry (containing 30% by weight of a homopolymer of vinyl chloride having an average polymerization degree of 1000 and containing 25000 ppm of vinyl chloride monomers) after polymerization reaction was quickly transferred to slurry tank 1, fed to heat exchanger 3 with pump 2 at 20 m³/h, heated, and then introduced into tower 4 for removing residual monomers as shown in FIG. 1 having seven such perforated plates as shown in FIG. 2 and FIG. 3 through PVC slurry introducing port 22. The PVC slurry flowed on treating passages divided with partition walls on perforated plates 32 to 38 and was subjected to a monomer removal treatment with steam (106° C., 600 kg/h) ejected from the small holes of perforated plates. PVC slurry flowing on the perforated plates was heated to 100° C. with the steam, flowed down to a lower perforated plates through a flow-down pipe, and was discharged from tower 12 for removing residual monomers through PVC slurry discharging port 12. Subsequently, the PVC slurry was fed to heat exchanger 3 with pump 5, cooled down to 50° C. with the heat exchanger, and then introduced into PVC slurry tank 6.

Vinyl chloride monomers removed from the PVC resin slurry by contacting with steam on the perforated plates and reached up to the top of the tower while being accompanied with the steam, led through deaerating port 11 to condenser 7 where they were separated into vinyl chloride monomers and condensed water. The separated vinyl chloride monomers were fed to a liquidation and recovery process. When a large amount of vinyl chloride monomers were contained in the condensed water, the water was introduced again into the apparatus for removing residual monomers from PVC slurry introducing portions and treated again.

Results are shown in Table 1, and it is seen that residual vinyl chloride monomers were capable of being removed down to 230 ppb in Example 1. Yellowing index (Yellowing factor) of the PVC resin was as good as 2.52. Besides, adhesion of PVC particles on the introducing port 22 from which a PVC slurry was introduced and the wall surface of chamber 56 was not observed.

EXAMPLE 2

A PVC slurry was treated in the same manner as in Example 1 with the exception that a slurry containing 30% by weight of a homopolymer having an average polymerization degree of 700 and containing 25000 ppm of vinyl chloride monomers was used as PVC slurry and the slurry was introduced from PVC introducing port 19 (chamber 59).

Results are shown in Table 1, and it is seen that residual vinyl chloride monomers were capable of being removed down to 320 ppb in Example 2. Yellowing index of the PVC resin was 7.72. Besides, adhesion of PVC particles on the wall surface of chamber 59 was not observed. Further, evaluation of fish eyes was conducted to be extremely as few as 7 in 100 cm² of the PVC film.

Comparative Example 1

The same PVC slurry as used in Example 1 was treated with the same apparatus for removing residual monomers having the same specifications as in Example 1 with the exception that the apparatus had a slurry introducing pipe having a pipe diameter of 80A (D/d=1) and a slurry introducing port having the same diameter only at top chamber of the tower.

Results are shown in Table 1. Whereas residual vinyl chloride monomers were capable of being removed down to 180 ppb in Comparative Example 1, the yellowing index was 6.84 and became worse than Examples. Besides, PVC particles were adhered on the wall surface of chamber 56 and a part of them was adhered in a layer form.

Comparative Example 2

Comparative Example 1 was repeated by using the same apparatus as used in Comparative Example 1 with the exception that the same slurry as used in Example 2 was used.

Results are shown in Table 1. Whereas residual vinyl chloride monomers were capable of being removed down to 300 ppb in Comparative Example 2, the yellowing index was 8.76 and thermal degradation was progressed than that in Example 1. Besides, PVC particles were adhered on the wall surface of chamber 59 and they were unable to remove even by washing with water. Further, evaluation of fish eyes was conducted to be as great many as 2787 in 100 cm² of the PVC film, and the PVC was unsuitable as final product.

TABLE 1

| | Example 1 | Example 2 | Comparative example 1 | Comparative Example 2 |
|---|---|---|---|---|
| PVC slurry used (*) | [a] | [b] | [a] | [b] |
| Volume of micropores in PVC (ml/g) | 0.33 | 0.23 | 0.33 | 0.23 |
| Number of chambers in tower | 8 | 8 | 8 | 8 |
| Chamber No. in which PVC slurry was introduced (**) | 5 | 8 | 8 | 8 |
| Concentration of residual monomers in PVC slurry at sampling port (ppb) | 230 | 320 | 180 | 300 |
| Yellowing index of PVC molded product (ΔYI) | 2.52 | 7.72 | 6.84 | 8.76 |
| State of adhesion of PVC particles in PVC slurry introducing chamber after operation of 48 hours | A | A | D | C |

TABLE 1-continued

|  | Example 1 | Example 2 | Comparative example 1 | Comparative Example 2 |
|---|---|---|---|---|
| Number of fish eyes (number/100 cm$^2$) | — | 7 | — | 2787 |

(*) PVC slurry used:
[a] . . . Homopolymer of vinyl chloride having a polymerization degree of 1000, slurry concentration 30% by weight, concentration of residual monomers: 27000 ppm
[b] . . . Homopolymer of vinyl chloride having a polymerization degree of 700, slurry concentration 30% by weight, concentration of residual monomers: 25000 ppm
(**) Chamber No. in which PVC slurry was introduced: Chamber No. in which PVC slurry was introduced was counted from the bottom of a tower.

INDUSTRIAL APPLICABILITY

As will be clear from the results described above, the following effects can be achieved according to the apparatuses of the present invention for removing residual monomers:

(1) Residual monomers can be removed at a high efficiency from a PVC slurry while suppressing the thermal degradation of the PVC at a minimum extent.
(2) When removing residual monomers, contact time of a PVC slurry with steam can be adjusted to a time suitable to the PVC slurry thereby prevent the PVC from thermal degradation caused by the contact with steam for longer time than necessary.
(3) Residence time of a PVC slurry can voluntarily be controlled by changing a PVC slurry introducing portion while maintaining the amount of PVC slurry to be treated for demonomeriaztion constant.
(4) Dispersion of a PVC slurry in the chambers of a treating tower in which chambers the slurry is introduced can be prevented to avoid adhesion of PVC particles on the wall surface of the treating tower.
(5) When changing a PVC slurry to be treated, a PVC slurry and PVC particles hardly remain within a treating tower, and occurrence of fish eyes caused by mixing of a different grade of slurries can be avoided.

What is claimed is:

1. A method for removing residual monomers from a slurry containing a polyvinyl chloride and residual monomers after polymerization, with an apparatus comprising a cylindrical tower which has plural perforated plates provided in a vertical direction in the tower, plural chambers formed respectively on the perforated plates serving as the bottom surface of the chambers, slurry introducing devices provided at at least two of said chambers, flow-down sections provided between the perforated plates so as to allow the slurry to sequentially flow down from the perforated plate of an upper chamber to the perforated plate of a lower chamber, a steam introducing port provided at a bottom portion of the tower, a deaerating port provided at a top portion of the tower, a slurry discharging port provided at a chamber positioned lower than the chambers having said slurry introducing devices, and a hot water ejecting means provided directly under said perforated plates and directed toward at least the lower surface of said perforated plates, said slurry introducing devices comprising slurry introducing ports provided at said tower and slurry introducing pipes connected to the slurry introducing ports, the inside diameter of the slurry introducing pipes being enlarged at least 1.2 times toward the slurry introducing ports, which method comprises introducing the slurry into the tower in an amount of 0.1 to 300 m$^3$/h per 1 m$^2$ of the area of the perforated plates forming the bottom surface of said chambers, the linear velocity of the slurry at the slurry introducing port of the chamber being 6 m/sec or lower when the slurry is introduced from said slurry introducing devices, flowing the slurry down from at least one perforated plate, and discharging the slurry outside the tower.

2. An apparatus for removing residual monomers from a slurry containing a polyvinyl chloride and residual monomers after polymerization, comprising a cylindrical tower which has plural perforated plates provided in a vertical direction in the tower, plural chambers formed respectively on the perforated plates serving as the bottom surface of the chambers, slurry introducing devices provided at at least two of said chambers, flow-down sections provided between the perforated plates so as to allow the slurry to sequentially flow down from the perforated plate of an upper chamber to the perforated plate of a lower chamber, a steam introducing port provided at a bottom portion of the tower, a deaerating port provided at a top portion of the tower, a slurry discharging port provided at a chamber positioned lower than the chambers having said slurry introducing devices, and a hot water ejecting means provided directly under said perforated plates and directed toward at least the lower surface of said perforated plates, wherein said slurry introducing devices comprise slurry introducing ports provided at said tower and slurry introducing pipes connected to the slurry introducing ports, and the inside diameter of the slurry introducing pipes is enlarged at least 1.2 times toward the slurry introducing ports.

3. The apparatus for removing residual monomers according to claim 2 wherein an on-off valve is provided at the slurry introducing device provided at a chamber positioned below the uppermost chamber.

4. The apparatus for removing residual monomers according to claim 3 wherein the on-off valve is a ball valve.

5. The apparatus for removing residual monomers according to claim 3 wherein a hot water ejecting means is provided between the slurry introducing port and the on-off valve in the slurry introducing device with the hot water ejecting means being directed toward the on-off valve.

* * * * *